MOTION PICTURE PROJECTOR SYSTEM

Filed Aug. 10, 1967 6 Sheets-Sheet 1

INVENTOR
RICHARD C. PAINTON

BY James A. Smith
Robert W Hampton
ATTORNEYS

MOTION PICTURE PROJECTOR SYSTEM

Filed Aug. 10, 1967

6 Sheets-Sheet 2

INVENTOR
RICHARD C. PAINTON

BY James A. Smith
Robert W. Hampton
ATTORNEYS

MOTION PICTURE PROJECTOR SYSTEM

Filed Aug. 10, 1967

INVENTOR
RICHARD C. PAINTON

BY

James A. Smith
Robert W Hampton

ATTORNEYS

Oct. 13, 1970 R. C. PAINTON 3,533,688

MOTION PICTURE PROJECTOR SYSTEM

Filed Aug. 10, 1967 6 Sheets-Sheet 4

INVENTOR
RICHARD C. PAINTON

BY James A. Smith
Robert W Hampton
ATTORNEYS

INVENTOR
RICHARD C. PAINTON
BY
ATTORNEYS

INVENTOR
RICHARD C. PAINTON

BY James A. Smith
Robert W. Hampton
ATTORNEYS 3,533,688
Patented Oct. 13, 1970

3,533,688

MOTION PICTURE PROJECTOR SYSTEM

Richard C. Painton, Rochester, N.Y., assignor to Eastman Kodak Company, Rochester, N.Y., a corporation of New Jersey Filed Aug. 10, 1967, Ser. No. 659,718
Int. Cl. G03b *21/50*
U.S. Cl. 352—92 30 Claims

ABSTRACT OF THE DISCLOSURE

A motion picture projector selectively operable in forward or reverse directions at different speeds or in a still projection mode, and remotely controllable through a transistorized control circuit for changing mode and direction of projector operation, as well as for effecting automatic motion-still operation in response to light-transmitting or light-opaque code marks on different types of film. A signal inversion capability of the circuit permits use of either type of code mark. The projector is remotely reset to motion projection after still projection through either an electronic reset circuit or a momentary break switch. An electronic timer responsive to stopping of motion projection can be used to control the electronic reset.

BACKGROUND OF THE INVENTION

The present invention relates to motion picture film projectors and more particularly to projectors with control systems for selectively effecting motion and still projection of a film, as well as other operational modes of the projector.

Motion picture projectors are known which can be selectively operated in a motion or still mode of projection. For example, in U.S. Pat. No. 3,261,654, to Richard L. Faber et al. which issued on July 19, 1966, and is assigend to the same assignee as the present invention, there is disclosed a skip frame projector which can be selectively adjusted for forward or reverse motion projection at 54, 18 and 6 frames per second or for still projection by positioning a manual control member. In U.S. Pat. No. 3,165,251 which issued on Jan. 12, 1965 to E. Gerlach, also assigned to the same assignee as the present invention, there is disclosed an electrically controlled skip frame projector which can be selectively operated at a plurality of speeds.

In commonly assigned copending application Ser. No. 590,067, filed Oct. 27, 1966, by Miles C. O'Donnell et al.; there is disclosed, inter alia, a control system for a projector of the type disclosed, for example, in the above mentioned Faber et al. Pat. No. 3,261,654. The system provides for remote control over such operations as effecting operation of the projector in either forward or reverse motion modes of projection, either motion or still modes of projection, and forward or reverse single frame modes of projection. The system can, of course, effect still projection of selected frames, and an important feature of the system permits the user to pre-select frames on a film strip to be automatically still-projected as the film strip moves through the projector. This last mentioned feature takes the form, in the preferred embodiment, of a light sensitive detector arrangement for automatically effecting still projection of selected frames in response to code marks formed on the film strip. Changeover to and from this automatic code responsive operation can be remotely controlled from the same station from which the other operational changes are effected. The system also may include a timer for shifting the projector back to motion projection after still projection of a frame for a selected time.

SUMMARY OF THE INVENTION

The present invention relates to a projector control system of the general type disclosed in the said copending O'Donnell application Ser. No. 590,067, but includes improved features and additional features which attribute to the instant invention an overall improved operation and additional operational capabilities. More particularly, in accordance with one aspect, the control system of the instant invention includes an improved code mark responsive circuit for automatically effecting still projection of selected frames, and a code signal inversion arrangement whereby the circuit can be selectively set to respond to code marks of different or opposite types, such as light-transmitting and light-opaque code marks, so as to permit automatic operation with the different types of film in common use. The code mark responsive circuit of this invention preferably takes the form of an improved photocell network which provides more circuit drive and minimizes non-linerities that may be encountered in the network of said earlier application, and the signal inversion capability will readily accommodate a reversal of code mark contrast.

Another aspect of the present invention lies in the provision of an electronic reset which can be used instead of a mechanical delay switch for resetting the projector system to motion projection after it has been stopped for still projection of a selected frame.

Still another aspect of the present invention lies in the provision of an electronic timing control which can be used to control the electronic reset so as to provide for automatic return to motion projection after a predetermined time at still projection.

Finally, another aspect of the present invention lies in an improved switch arrangement for remotely controlling the various operational modes of the projector.

From the foregoing, it will be apparent that it is an object of this invention to provide an improved and more versatile control system for effecting changeovers between the various operational modes of a projector, as well as improved performance in the various operational modes.

Other subsidiary aspects, features, objects, and advantages of the invention will become apparent from the ensuing description and illustrations of exemplary embodiments of the invention. I have set forth in the appended claims those features and the like which I consider characteristic of my invention, but the invention itself, its construction, operation, and manner of use, will be best understood from the exemplary detailed description and illustrations.

DESCRIPTION OF THE PREFERRED EMBODIMENTS

Basic projector mechanism

Figures 1, 3:
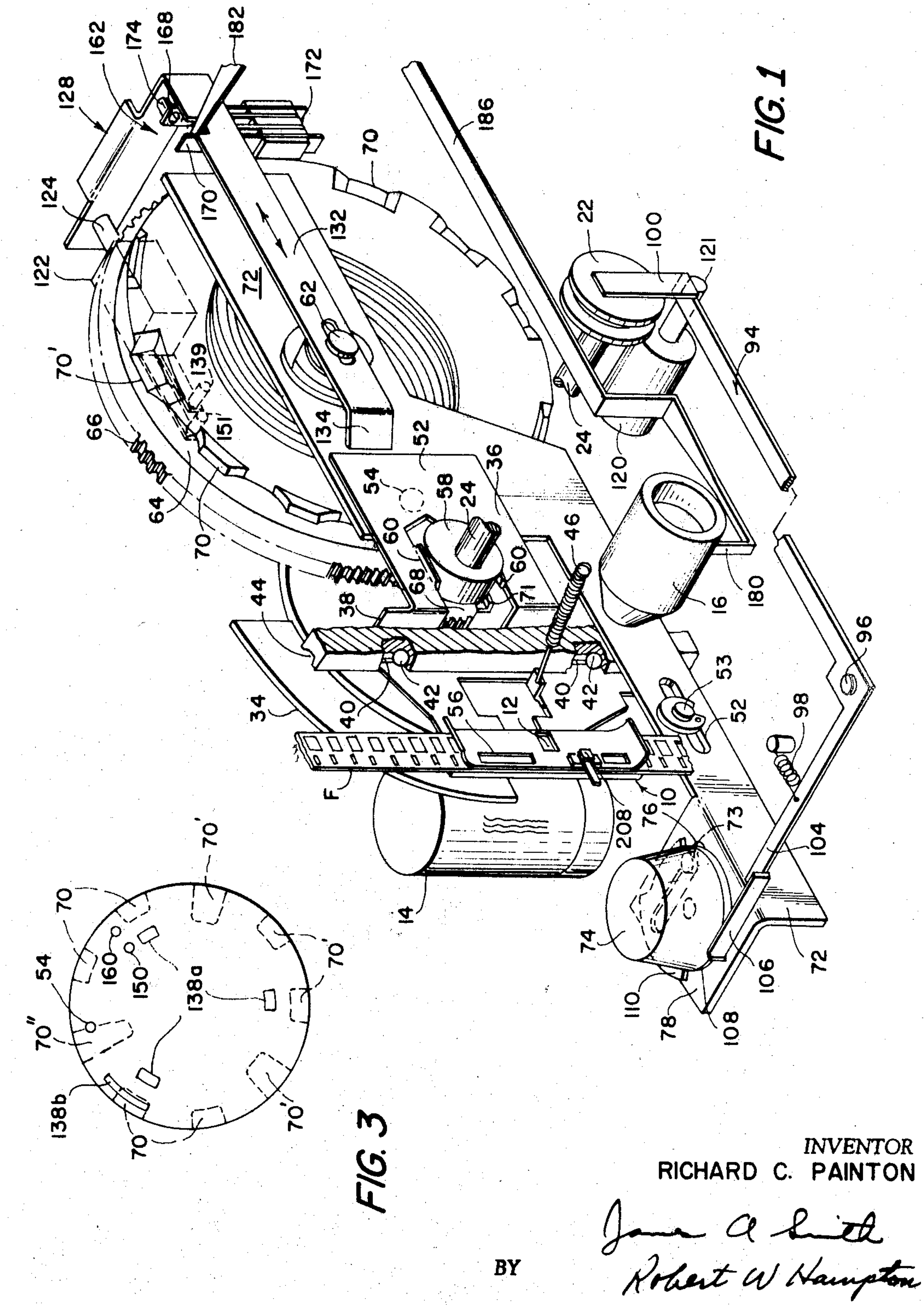
FIG. 1 is a perspective view of an exemplary embodiment of a film projector in accordance with the invention, only so much of the projector being shown as is sufficient for an understanding of the present invention.
FIG. 3 is a rear elevational view of the in-and-out face cam shown in FIGS. 1 and 2.

Referring now to the drawings, the invention is disclosed in connection with a projector mechanism similar to that disclosed in the said U.S. Pat. No. 3,261,654 (Faber et al.), and the copending O'Donnell application Ser. No. 590,067. It will be apparent to those skilled in the art, however, that the invention can be readily applied to other projectors, and that the illustrated projector is merely exemplary of an application of the invention.

Figures 2, 4, 5, 6:
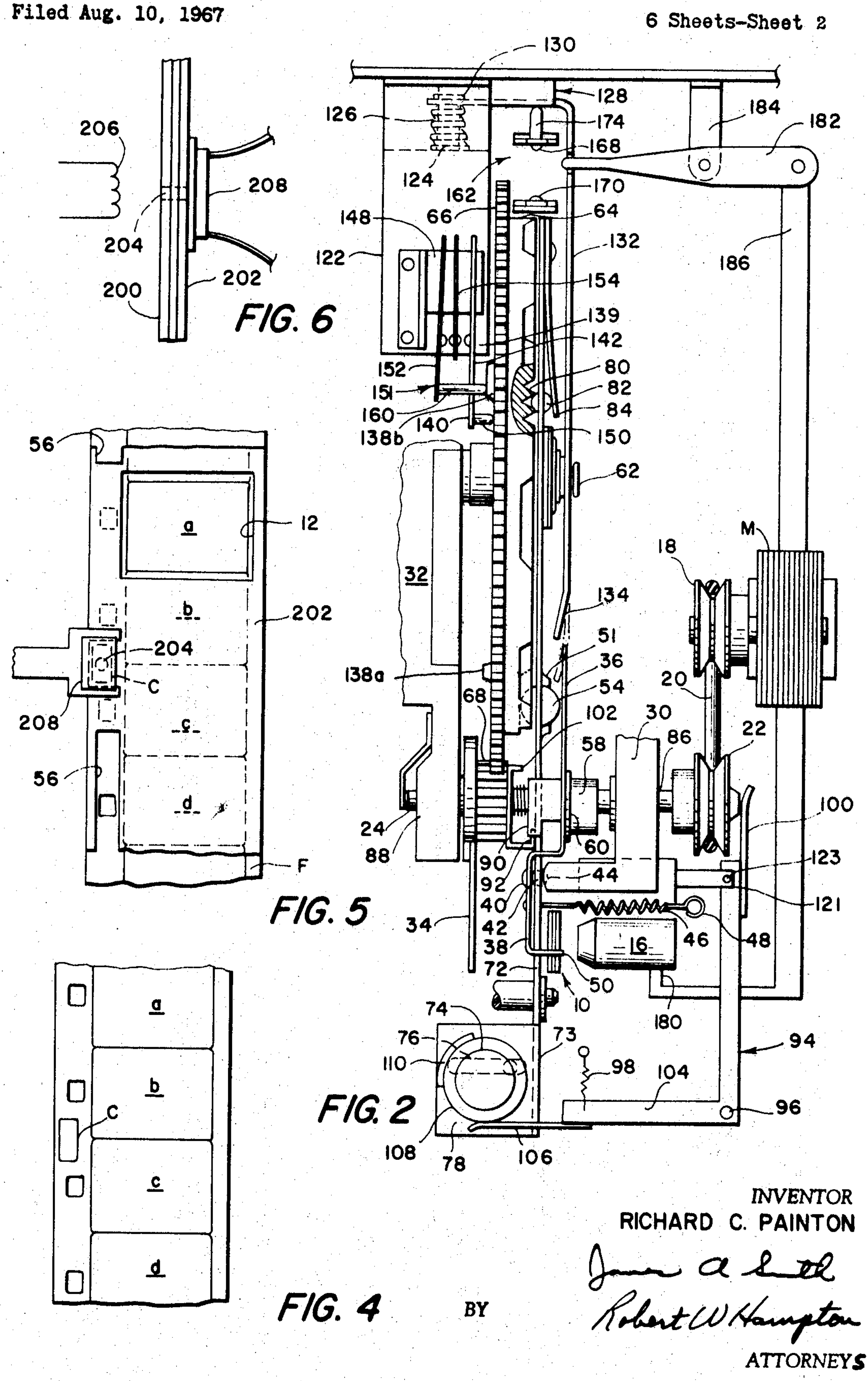
FIG. 2 is a top view in partial section of the structure shown in FIG. 1.
FIG. 4 is a detail of a portion of a coded film strip to be used with the projector mechanism shown in FIGS. 1 and 2.
FIG. 5 is an enlarged front view of the film gate shown in FIGS. 1 and 2.
FIG. 6 is an enlarged side view of the film gate and light sensing means shown in FIGS. 1 and 2.

Referring specifically to FIGS. 1 and 2 of the drawings, there are shown the parts of a projector which are sufficient for an understanding of the present invention. In general, the projector includes a film gate 10 defining an aperture 12 which is illuminated by a lamp 14 located behind the gate 10. A motion picture film F is adapted to be intermittently moved through the gate 10 by a pull-down claw mechanism later to be described. As each frame of the film is moved into alignment with the aperture 12 in the gate 10 it is illuminated by the lamp 14 and projected by a lens system 16. As will later be described in more detail the lens system 16 may be remotely focused for still and motion projection.

The prime mover or drive means of the projector comprises an electric motor M (FIG. 2) driving a drive pulley 18 fixed to the motor drive shaft. The pulley 18 is connected by a belt 20 to a driven pulley 22 fixed to the end of a main drive shaft 24 which lies to one side of, and extending substantially parallel to, the optical axis of the projector. Drive shaft 24 is rotatably and slidable mounted in bearings, not shown, but mounted at 86 and 88 in supporting walls 30 and 32 forming parts of the projector. Under normal load conditions the motor shaft will operate at approximately 3240 r.p.m., or 54 r.p.s. Motors having this operating speed are commercially available. The pulley and belt combination is so chosen that this same frequency of rotation is transmitted to the drive shaft 24. The light beam is cut off from the projection aperture of the gate by a rotating sector shutter 34 connected to the drive shaft 24 in a manner hereinafter described. Since the shutter 34 has but a single cut-off blade it will intercept the light beam at 54 cycles per second and only at the time the film is being moved through the gate, as is well known in the art.

Turning now to the intermittent film feeding mechanism, there is included a rigid claw arm 36 extending laterally of the film to be fed and having an offset portion 38 intermediate its two ends. The claw arm 36 is mounted to move up and down and pivot relative to the film gate 10 by having a pair of vertically spaced ball seats 40 formed in the forward face thereof rotatably seating a pair of spaced ball bearings 42 which are in turn rotatably positioned in a vertical ball race 44 formed in one edge of the forward wall 30 of the projector. The claw arm 36 is held in assembled relation on the ball bearings 42 by a spring 46 one end of which is attached to the claw arm on the side of the pivot point nearest the gate and the other end of which is attached to a pin 48 fixed to the projector. The spring 46, in addition to holding the claw arm in assembled relation with its ball mountings, also acts to bias one or more film engaging claws or teeth 50 on one end of the arm toward the gate 10 into a film engaging position. In addition the spring 46 also acts to force the other end of the claw arm 36 against a ball 54 which acts as a follower engaging the in-and-out cam means as will be more fully described hereinafter. As is well known, the claw arm will reciprocate up and down on the ball bearings to effect the film advance and will pivot about these ball bearings to move the claw teeth 50 into and out of engagement with the film, the gate being provided with elongated slots 56 to accommodate the teeth and allow the up-and-down movement of the claw while the teeth 50 are in engagement with the film.

In the arrangement shown, the up-and-down reciprocal movement of the claw arm edgewise for feeding the film is under the control of an up-and-down or pull-down cam 58 fixed to the drive shaft 24 and embraced by a pair of followers 60 fixed to the claw arm 36 and extending substantially at right angles to the vertical ball race 44. Since each revolution of the up-and-down cam 58 produces one complete reciprocal stroke of the claw arm 36, and since the drive shaft is rotating at 54 r.p.s., the claw arm 36 will be reciprocated at a rate of 54 strokes per second.

The in-and-out movement of the pull-down claw relative to the film gate is produced by skip-stroke mechanism which will now be described. Fixed to a shaft 62 rotatably mounted in the wall 32 of the projector and in substantially parallel relation with drive shaft 24 is a wheel or face cam 64 one surface of which is fixed to or carries a gear 66. Gear 66 is driven by a pinion 68 which is rotatably and slidably mounted on the drive shaft 24 and is selectively coupled thereto by a clutch means to be fully described hereinafter. The shutter 34 is fixed to the pinion 68 to rotate therewith.

The other, or forwardly directed, surface, of the face cam 64 is provided with a plurailty of depressions 70, 70′, and 70″ which are spaced circumferentially about the surface of face cam 64 and have their leading and trailing edges tapered into the surface of the came so that a follower pressed against the face of the cam can move into and out of the depressions as the cam rotates. These depressions, therefore, constitute cam surfaces which in combination with the surface of the face cam 64 form a series of concentric in-and-out cams whose profiles control the in-and-out movement of the claw. Depressions 70′ are approximately twice as long, measured in a radial direction of the face cam, as depressions 70, while depression 70″ is approximately three times as long as depression 70 measured in the same sense. Accordingly, starting at the outside of the face cam, and moving radially inwardly thereof, we have a series of concentrically arranged in-and-out cams comprising an outer group of nine depressions separated by nine high areas of substantially the same arcuate length as the depressions, then a group of three depressions separated by three high areas having an arcuate length substantially thre times that of the depressions, then a group consisting of one depression, and finally a concentric circle in which there are no depressions. This arrangement of cam surfaces provides a multiple in-and-out cam by means of which the skip-rate of the in-and-out movement of the claw can be changed relative to the pull-down stroke to vary the rate by which the film is advanced through the gate by merely moving the ball follower 54 radially of the face cam and into alignment with different ones of said concentric and circular cam surfaces. In-and-out movement is transmitted to the claw arm 36 from the in-and-out cams by the ball follower 54 which is pressed against the face of the in-and-out cam 64 by the follower end 52 of the claw arm which is loaded in this direction by the action of spring 46 biasing the claw arm 36 into engagement with the film. It will thus be seen that spring 46 in addition to forcing the ball follower into engagement with the in-and-out cam also serves to hold the ball follower in assembled rotation. The depressed cam surfaces 70, 70', and 70'' are of such depth that when the ball follower drops into one of the same the spring 46 can pivot the claw arm 36 far enough to engage the claw teeth 50 with the film perforations. On the other hand, when the ball follower 54 rides out of a depression and onto the surface of the face cam between depressions the claw arm will be pivoted against the action of spring 46 by a sufficient amount to withdraw the claw teeth from the film path. Accordingly, each circular series of depressed cam surfaces in combination with the face surface of the cam therebetween will constitute a circular in-and-out cam for controlling the movement of the claw teeth 50 to and from the film path of the gate 10. While the innermost circle of the in-and-out cam described has no depressed cam surfaces, the face surface of the cam causes the claw to be held out of engagement with the film for the projection of "stills" and in reality constitutes an in-and-out cam despite the fact it possesses no depressed cam surfaces.

The reduction ratio between pinion 68 and gear 66 on the face cam 64 is nine to one (9:1). Since there are nine depressed cam surfaces on the outer circular group of the face cam, when the ball follower is positioned radially of the face cam to engage this group it will produce an in-and-out stroke of the claw for each revolution of the up-and-down cam 58. This means that the film F will be pulled down one frame per revolution of the cam 58 or at a rate of 54 frames per second. When the ball follower 54 is moved radially inward of the face cam to engage the next circular group of depressed cam surfaces, or that circle containing three depressed cam surfaces 70' and 70'', the claw arm 36 will be moved in and out once for every three revolutions of the up-and-down cam 58 and the film will be advanced at a rate of 18 frames per second. When the follower ball 54 is moved inwardly to the circle containing one cam surface 70'' it produces one in-and-out stroke of the claw arm 36 for every nine revolutions of the up-and-down cam 58 and advances the film at a rate of six frames per second.

If the ball follower 54 is moved in on the face cam 64 to a position where there are no depressed cam surfaces there will be no in-and-out movement of the claw and the claw teeth will be held out of engagement with the film by the face surface of the cam. This position of the ball follower will produce a condition for still projection in which the shutter continues to run at 54 frames per second.

The ball follower 54 is captured in an aperture 51 in the end of a shift lever 72 which may be adjusted back and forth as indicated by the double ended arrow in FIG. 1 to vary the rate of film advance by positioning the ball follower radially of the face cam to selectively engage the different groups of cam surfaces.

The shift lever 72 may be pushed back and forth in the direction of the double arrow shown in FIG. 1 by means of an eccentric pin 73 on a control knob 74 which engages an elongated slot 76 in a turned-over end 78 on the end of the shift lever 72. The control knob 74 can be rotatably mounted on a control panel, not shown, of the projector and a pointer thereon can co-operate with a speed scale calibrated in rates of 54, 18, 6, 0, forward or still, and corresponding frames per second in reverse. The control knob 74 is capable of a movement slightly greater than 180°, and in going from one limit of this movement to the other shifts the ball follower 54 from the position where it engages the outermost group of cam surfaces on the face cam (54 frames per second) to its innermost position on the face cam (still projection) and then out again on the cam surface to the 54-frame-per-second position.

When the shift lever 72 is moved in the direction of the double arrow shown in FIG. 1, the radial position of the ball follower 54 on the in-and-out cam is determined by the radial position of four concentric skip-frame detent grooves 80 in the surface of the face cam 64 into which detent ball 82, captured in an aperture in the shift lever 72, is forced to drop by a detent spring 84.

In order to achieve reverse projection in addition to variable rate pull-down and without having to stop or reverse the direction of the mootr or the drive shaft 24, means are provided for reorienting the up-and-down cam 58 from its original position relative to the in-and-out cam 64. When this is done, the in-and-out cam 64 which normally forces the claws into the film path just prior to the start of the down stroke and withdraws them from the film path at the end of the down stroke, will instead force the claws into the film path just prior to the beginning of the up stroke and withdraw them from the film path at the completion of the up stroke of the claw arm 36.

Referring specifically to FIG. 2 the drive shaft 24, which is always rotatably driven in one direction, is slidably mounted in bearings at 86 and 88. Pull-down cam 58 is fixed to shaft 24 and pinion 68 is rotatably and slidably mounted thereon as described above. When the projector is operating in a forward direction, a driving dog 90 on the pull-down cam 58 drives a forward driving dog 92 on the pinion 68. The pinion 68 in turn drives the in-and-out cam 64 which controls the axial movement of the ball follower 54 as described above. The single bladed shutter is fixed to the pinion 68 and is so timed relative to the forward dog 92 that it covers the gate aperture during the forward indexing stroke of the claw.

A shift lever 94 which pivots about a stationary pivot 96 on the projector is normally biased in a clockwise direction by a spring 98 and has a finger 100 adapted to engage the face of pulley 22. The finger 100 does not contact the face of the pulley 22 when the mechanism is set for forward projection.

To reverse the projector the shift lever 94 is pivoted counterclockwise about its pivot 96 to cause the end of finger 100 to engage the face of pulley 22 and shift the drive shaft 24 axially to the left. In this new position (not shown) of the drive shaft 24, the driving dog 90 on the pull-down cam 58 slips off the forward driving dog 92 on the pinion 68. As a result pinion 68 slips back precisely 180° until its reverse driving dog 102 comes into engagement with the driving dog 90 on the pull-down cam 58 and continues to operate in this position to effect reverse projection.

In order that the mechanism can only be reversed when the film claw is disengaged from the film, the reverse of the projector is made dependent upon rotation of the control knob 76 as will now be described. The end 104 of shift lever 94 has fixed thereto a follower 106 which is held by spring 98 against the periphery of a cam 108 fixed to control knob 74 for rotation thereby. The cam 108 includes an arcuate lobe 110 which has a rise which will cause the shift lever 94 to be pivoted counterclockwise to reverse the projector when the lobe is moved into engagement with the follower 106. The lobe 110 is so positioned on the control knob 74 relative to the eccentric pin 73 thereon that it will not engage follower 106 to reverse the projector except when the control knob 74 is in a position to have shifted the ball follower 54 radially of the in-and-out cam to a position where the claw is held out of the film and the film speed is stopped. In other words the projector can be reversed manually only when the rate control knob is in a position to give a "still" projection. The lobe 110 is of such arcuate length that after the control knob is moved counterclockwise from the position shown in FIG. 2 and through the "still" position it will hold the mechanism in the reversed condition while the control knob is rotated further in a counterclockwise direction to produce the full range of rate variations of which the mechanism is possible. Therefore, both the direction and speed of projection will be determined by the setting of the control knob 74 in such a way as to ensure that these two operations can occur in only the proper sequence.

The variable rate pull-down system and reversing mechanism thus far described is the same as that disclosed in U.S. Pat. No. 3,261,654 (Faber et al.), and the above mentioned O'Donnell application Ser. No. 590,067, and reference is made to said patent for a more specific description of the function and operation of the system.

Remote control—forward and reverse operation

Remote control over forward and reverse operation is achieved by providing a solenoid 120 (FIG. 1) to position the shift lever 94 about pivot 96 independently of the knob 76. More specifically, the plunger 121 of the solenoid 120 is connected to the lever 94 by a pin 123. The solenoid 120 is mounted on the projector housing. Upon energization of the solenoid 120, the plunger 121 will displace the lever 94 to the same extent as cam lobe 110 to effect a transition from forward to reverse in the manner hereinbefore described. As will hereinafter be described in more detail, energization of the solenoid 120 is controlled by switch means movable between forward and reverse positions wherein solenoid 120 is de-energized and energized respectively. The switch means forms part of the control circuitry hereinafter described whereby the forward and reverse operation can be remotely controlled.

Remote control—motion and still projection

To accomplish selective remote control over still and motion projection, means are provided for rendering the ball follower 54 ineffective to pivot the claw arm, in response to a control signal. Referring to FIGS. 1 and 2 and more specifically to FIG. 2, this means comprises an electric solenoid 122 mounted on the projector housing adjacent the face cam 64 and having a plunger 124, biased to the position shown in FIG. 2 by a spring 126. The solenoid 122 is effective to selectively position a two-position operating lever 128, one end of which is operatively connected to the plunger 124 and biased into engagement with a flange 130 on said plunger by spring 126. The operating lever 128 extends to one side of the face cam 64 and has an arm 132 extending parallel to the plane of the face cam 64 toward the claw arm 36. In the de-energized condition of solenoid 122 (motion projection) the lever 128 and armature pin 124 are biased to the position in FIG. 2. In the energized condition of the solenoid 122 (still projection) the lever 128 is displaced to effect movement of the arm 132 to the position indicated by the dashed lines in FIG. 2.

The end of arm 132 is provided with a bent portion 134 which is adapted to engage and restrain the claw arm 36 when the solenoid 122 is energized. As shown in FIG. 2, the claw arm 36 assumes the position shown in solid lines when the follower 54 engages the bottom of one of the depressions 70, 70′, and 70″, and the position shown in dashed lines when the follower 54 engages the flat surface of face cam 64. In the de-energized condition of solenoid 122 (motion projection) the claw arm 36 can freely move between the two positions indicated to effect in-and-out movement of the claws 50 in the manner hereinbefore described. However, if the solenoid 122 is energized, movement of the lever arm 132 will position the bent end portion 134 thereof between the claw arm 36 and face cam 64 as indicated in broken lines in FIG. 2 to prevent movement of the claw arm 36 when one of the depressions 70, 70′ and 70″ is positioned in alignment with ball follower 54. It will be thus apparent that energization of the solenoid 122 in the manner described will immediately disable the claw arm 36 to render the same ineffective to advance film through the gate 10.

In order to obtain a smooth transition from still projection to motion projection and vice versa means are provided for synchronizing energization and de-energization of the solenoid 122 with the position of claw arm 36. This means includes a mechanical commutator system associated with the face cam 64 which functions to establish an energizing circuit for the solenoid 122 only during a range of angular positions of the face cam 64 when the claws 50 are disengaged from the film and the claw arm 36 is in the position indicated by the dashed lines in FIG. 2.

Referring more specifically to FIG. 2 and FIG. 3 of the drawings the mechanical commutator system includes a cam means comprising a plurality of cam lobes **138*a* (in this case 3) radially spaced on a circle on the surface of the face cam 64 opposite from the surface which includes depressions 70, 70′ and 70″. A second cam means comprising a single cam lobe 138*b*** is positioned on an outer circle of said surface.

The cam lobes **138*a* are effective to intermittently close the contacts of an electrical switch means 139, shown in FIG. 2, comprising a pair of flexible contact carrying arms 140, 142 (directly below arm 154) having normally open juxtaposed electrical contacts as shown. The contact arms 140, 142 are supported by an insulating block 148 which is mounted on the housing of solenoid 122. The arm 140 is provided with a cam engaging pin 150 adapted to be engaged by the lobes 138*a* to close the switch contacts three times during each revolution of the cam 64. The cam lobes 138*a* and contact arms 140 and 142 are positioned relative to the depressions 70, 70′, and 70″ in the other surface of the face cam 64 to effect closing of the contacts therein only during a predetermined portion of the pull-down cycle of claw arm 36 to prevent energization of the solenoid 122 when the claws 50** are in engagement with the film as will later be described in more detail.

The cam lobe **138*b* is effective to intermittently open the contacts of a second switch means 151 comprising a pair of flexible switch arms 152 and 154 (shown in FIG. 2 directly above arm 142) supported by the insulating block 148 and provided with a pair of normally closed juxtaposed electrical contacts as shown. The switch arm 152 is provided with cam engaging pin 160 adapted to be engaged by the cam lobe 138*b* as shown in FIG. 2 to effect momentary opening of the switch contacts to control energization of a holding circuit for solenoid 122** as will later be described in more detail.

The cam lobes **138*a* and 138*b* may be positioned on the face surface of the cam 64 substantially in the positions indicated relative to the cam lobes 70, 70′ and 70″ and have the relative length dimensions substantially as shown. The exact positions and lengths of the lobes 138*a* and 138*b*** are dependent on the time constants of various elements in the projector system and are readily determinable by persons skilled in the art.

A third switch means 162 comprising a pair of normally open contacts 168 and 170 is supported in an insulating block 172 adjacent the operating lever 128 to be responsive to the position thereof. The contacts 168 and 170 are biased to an open position and are controlled by the axial movement of a pin 174, the end of which is positioned in engagement with lever 128. When the lever 128 is displaced in response to energization of solenoid 122, the pin 174 will be displaced axially to close contacts 168 and 170 for a control purpose to be described subsequently.

Remote Control—Motion and still focusing

To provide for remote control over motion and still focusing, the lens system represented by housing 16 preferably takes the form of that disclosed and claimed in copending application Ser. No. 590,066, filed Oct. 27, 1966, by Robert J. Roman et al., and in a continuation-in-part thereof filed concurrently herewith by Roman et al., entitled "Adjustable Lens System For a Motion Picture Projector." As described in said copending applications the optical system may be selectively positioned between predetermined motion and still focus positions by the displacement of an actuating lever 180. Preferably, lever 180 is positioned in the projector system herein disclosed in response to energization of solenoid 122 to effect adjustment of the optical system to a still focus condition. To this end a lever 182 is pivoted on a housing-supported bracket 184 and has one end engaging a notch in the lever arm 132 and the other end thereof operatively connected to one end of an elongated lever 186, the other end of the lever 186 being operatively connected to lever 180. It will be apparent that when the actuating lever 128 is displaced in response to energization of solenoid 122, lever 182 will be pivoted counter-clockwise to position lever 186 and effect displacement of lever 180 to adjust the lens system in housing 16 for a still focus condition. Upon de-energization of solenoid 122 the parts will be actuated in the opposite direction to return the optical system to the motion focus position. Reference is made to the said copending applications for a complete description of the structure and operation of the lens system 16.

Film coding and detection

In accordanace with one feature of said copending application Ser. No. 590,067 (O'Donnell et al.), still projection of selected frames of the filmstrip may be selectively programmed by the poistion of code marks on the film, and a control circuit is responsive to the presence of the code marks to automatically effect still projection in accordance with the code format, as set forth in said application.

Thus, referring to FIG. 4 of the drawings, film F is illustrated in detail as comprising consecutive picture frames *a*, *b*, *c*, *d*, etc, each having a sprocket hole in the film border on the frame centerline. The film F may be coded by providing code marks on the film border between the sprocket holes. The code spot C on the film is detected by the means now to be described to effect a shift of the projector system from motion to still projection as will later be described in connection with the operation of the control circuit.

Preferably, a code spot C is located on the film one and one-half frames in advance of a frame to be projected in still.

The code spot C depicted in FIG. 4 is located to effect still projection of frame *a*. As will be apparent to those skilled in the art various other spacings are possible and the disclosed arrangement of code marks is merely in accordance with one preferred embodiment.

In accordance with one feature of the present invention the system is made selectively responsive to two different types of coding. Depending on the type of film, that is, whether the film is straight or reverse printed, different types of code marks on the filmstrip are required, and thus for the system to be capable of using both types of film the system must be able to respond to both types of code marks. In accordance with a presently preferred embodiment of the invention both transparent code marks on a non-transparent film base and non-transparent code marks on a transparent base are usable in a projector system in accordance with the invention.

A transparent code mark C may be formed on a non-transparent border by exposing the film in the area of the mark so that a transparent spot will appear upon film development. Alternatively a code mark can be edited onto the film by hand after development by scraping the emulsion off the film base in the desired location. Code marks formed by either method can be edited out by covering the transparent spot with opaque ink.

With a transparent film border the code spot can comprise non-transparent or opaque spots on the border. The opaque code marks can, for example, be formed by spots of opaque ink.

Code marks C can be selectively positioned on the film F in the manner described above to be detected by a code detecting means associated with the film gate 10. Referring to FIGS. 1, 5, and 6 the gate 10 comprises an aperture support plate 200 and a film pressure plate 202 between which the film is advanced by operation of the film advancing mechanism hereinbefore described to effect illumination of the film frames by lamp 14 in the manner well known to those skilled in the art.

The aperture support plate 200 and pressure plate 202 are provided with aligned openings defining a code mark aperture 204 in the gate 10 located near the edge of the gate 10 and spaced from the frame aperture 12 by a distance equal to one and one-half film frames. The arrangement may be such that code mark C on the film F will be aligned with the aperture 204 when the frame *a* is aligned with frame aperture 12 to produce an electrical signal.

To detect the code mark a lamp 206 is positioned in alignment with aperture 204 and a photoelectric cell 208 is mounted on or adjacent to the pressure pad 202 over the code aperture 204 by any suitable means, such as a bracket. For a transparent code mark, in the absence of a code mark C, the non-transparency of the film margin prevents illumination of the photocell 208 by the lamp 206. However, when a code mark C becomes aligned with the code aperture 204 the cell 208 will be illuminated by passage of light through the transparent area forming the code mark to produce an electrical output signal. Conversely, when a non-transparent code mark is used, in the absence of a code mark C photocell 208 will be illuminated by lamp 206. When a code mark becomes aligned with the code aperture, the mark prevents illumination of cell 208 by the lamp 206 and the output of cell 208 drops to zero.

The control circuit of this invention, later to be described, is responsive to the output of the photocell 208 during alignment of a code mark C with the aperture 204 to effect still projection of the frame then aligned with the projector aperture 12 and is selectively responsive to effect still projection for both transparent and non-transparent marks.

Control circuit

Figure 7:
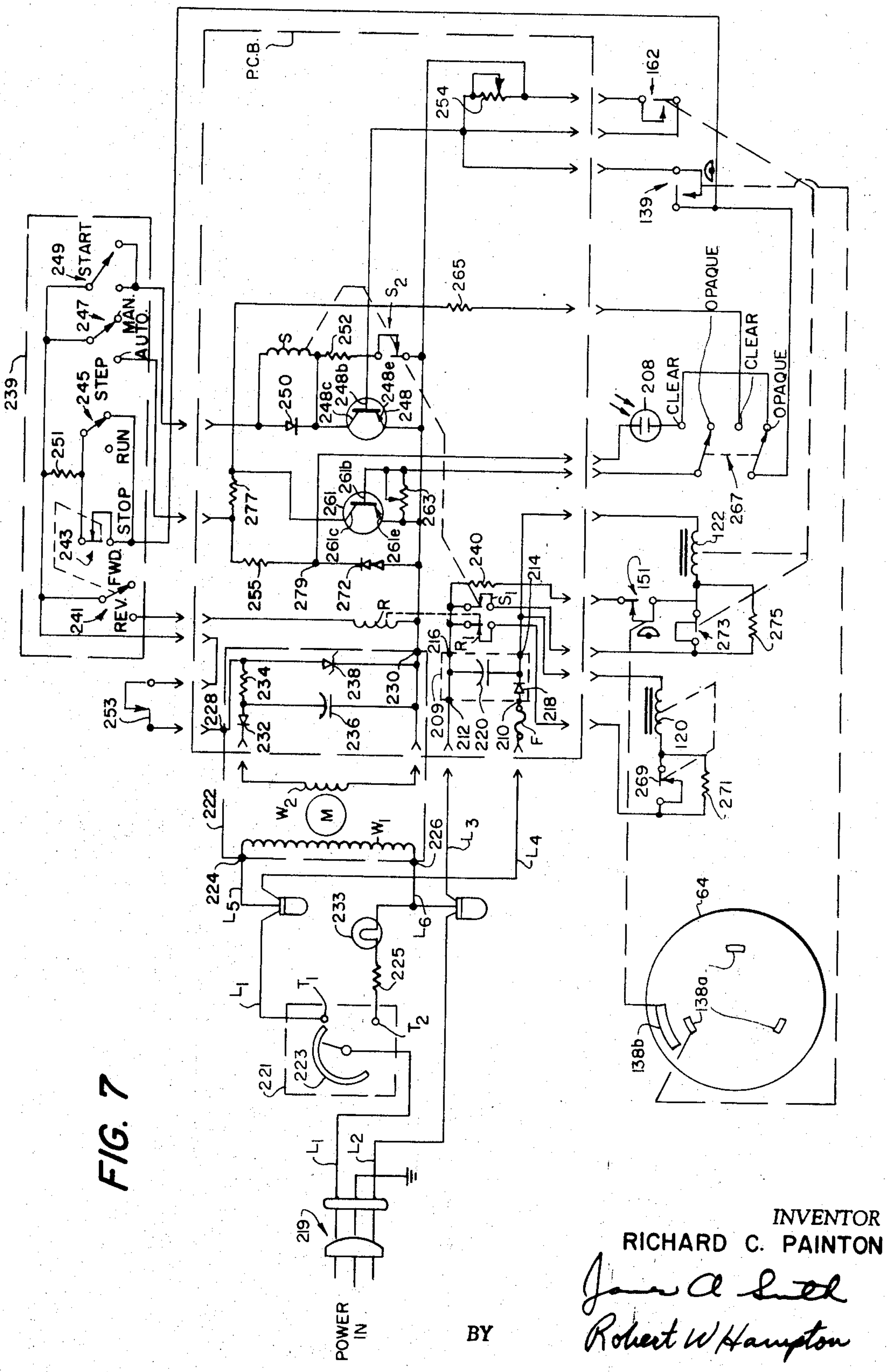
FIG. 7 is a schematic diagram of a preferred embodiment of a control circuit in accordance with the invention for controlling the operation of the projector system.

Referring to FIG. 7 of the drawings there is shown a control circuit in accordance with the invention for selectively controlling energization of the solenoids 120 and 122 to effect selective remote control over forward and reverse projection, and still and motion projection. The circuit is also selectively responsive to photocell 208 during motion projection to effect still projection of selected frames in accordance with a code program on the film.

The control circuit includes a direct voltage power supply 209 having input terminals 210 and 212 connected to an input 219 of alternating line voltage through a fuse F, a conductor $L_4$, a conductor $L_1$ and a switch 221, and conductors $L_3$ and $L_2$, respectively, and having a pair of direct voltage output terminals 214 and 216. The power supply 209 in the disclosed embodiment includes a diode rectifier element 218 connected in series between the input terminal 210 and output terminal 214 and a filter capacitor 220 connected across the output terminals 214 and 216. The rectifier 218 and capacitor 220 are effective to produce relatively smooth half wave rectification of the alternating line voltage in a manner well known to those skilled in the art and further description is deemed to be unnecessary.

The circuit of FIG. 7 also includes a low voltage power supply 222 having input terminals 224 and 226 coupled to input 219 through conductors $L_5$, $L_1$ and switch 221, and conductors $L_6$ and $L_2$, respectively, and output terminals 228 and 230 across which a relatively low voltage output signal is developed. In the disclosed embodiment the power supply 222 takes the form of a motor-former power supply established by providing the alternating current projector drive motor M with an output winding $W_2$ inductively coupled to the motor input winding $W_1$ as diagrammatically indicated in FIG. 7. The lower end of winding $W_2$ is electrically connected to output terminal 230 while a diode rectifier 232 and resistance 234 are connected in series between the upper end of winding $W_2$ and output terminal 228. A capacitor 236 is electrically connected between the lower end of winding $W_2$ and the common junction of rectifier element 232 and resistance 234. A Zener diode 238 is shunted across the output terminals 228 and 230 to produce a regulated voltage output. The motor-former power supply 222 is also of a form well known to those skilled in the art and a specific description of the operation thereof is deemed to be unnecessary.

Switch 221 comprises a rotatable semicircular contact arm 223 and contact terminals $T_1$ and $T_2$ arranged in the path of contact arm 223. With contact arm 223 contacting terminal $T_1$ the circuits for power supplies 209 and 222 are completed and projector drive motor M is started up. Through further rotation of contact arm 223 terminal $T_2$ may also be contacted to thereby complete a lighting circuit including a lamp 233 and a resistance 225.

Forming part of a printed circuit board P.C.B., the power supply 209 comprises an energizing voltage source for reverse solenoid 120 and stop solenoid 122. More specifically, the reverse solenoid 120 is connected in series with the normally open switch contacts $R_1$ of a reversing relay R across the output terminals 214 and 216 of power supply 209. This series connection includes a current limit switch 269 which is connected in parallel with a resistance 271. The stop solenoid 122 is connected in a parallel circuit in series with the normally open switch contacts $S_1$ of a stop relay S and a current limit switch 273 which is connected in parallel with a resistance 275. The normally closed cam operated switch 151 previously described is connected in series with a current limiting resistance 240 in a circuit shunting the relay contacts $S_1$ to establish a holding circuit for stop solenoid 122, which is periodically broken for a purpose which will later be described in detail.

In accordance with one feature of the invention the output terminal 228 of low voltage power supply 222 is connected through a switch 253 to a remote control unit 239 which comprises a series of five switches 241, 243, 245, 247, and 249 for controlling the operation of the projector.

Switch 253 when opened disconnects the entire remote control unit 239 and may be opened, for example, during 54 frames per second operation, since adequate response times for the circuit components may not be available at that speed. Switch 253 (and corresponding switch 253' in FIG. 8) will be presumed to be closed in the remainder of the discussion of FIGS. 7 and 8.

Switch 241 is a reversing switch and is connected in series with reversing relay R between terminals 228 and 230 of supply 222. When switch 241 is closed reversing relay R will be energized to close relay switch contacts $R_1$ and energize reverse solenoid 120.

Switch 243 is a normally open switch used to stop the motion of the projector. One side of switch 243 is connected through a resistor 251 to terminal 228 of supply 222 while the other side is connected through normally open, cam lobe operated switch 139 to the base **248*b* of a transistor 248 of a control circuit for stop solenoid 122.** This control circuit will be described in detail hereinbelow.

Switches 241 and 243 are mechanically interlocked as is indicated by the dotted line in FIG. 7 so that stop switch 243 must be actuated or closed to gain access to reverse switch 241. The mechanical interlock between switches 243 and 241 prevents film damage by ensuring that the motion of the film is stopped before reversal of the motion of the film takes place. A particularly suitable combined switch mechanism for this purpose is disclosed and claimed in a commonly assigned application entitled "Switch Interlock Mechanism," filed concurrently herewith by Roman et al.

Switch 245 is a two position run or step switch and when in the step position is connected through switch 139 to the base **248*b* of transistor 248 in the same way as stop switch 243, switch 245 being connected in parallel across switch 243. When run/step switch 245 is in the step position, opening and closing of the connection between supply terminal 228 and base 248*b* of transistor 248 and hence, as is described hereinbelow, energization of stop solonoid 122, is controlled by switch 139 which, in turn, is controlled by cam lobes 138*a*. In the run position, switch 245 disconnects the supply 222 from the control circuit for stop solenoid 122** and thus the projector will continue to run.

Switch 247 is a two position switch for converting to and from automatic or code responsive operation. In the automatic position switch 247 provides a connection between the supply 222 and an automatic code responsive control circuit including photocell 208. This photocell control circuit will be described in detail hereinbelow. In its manual position switch 247 disconnects the photocell control circuit.

Switch 249 is a momentary break switch used to manually reset a holding circuit for stop relay which controls stop solenoid 122. Reference may be made to a commonly assigned application entitled "Momentary Break Switch," filed concurrently herewith by Conrad Diehl for details of a particularly suitable switch.

To provide a better understanding of the function of switch 249, the nature and function of the control circuit for solenoid 122 will now be described. This circuit comprises a p-n-p transistor 248 having its collector **248*c* connected, through stop relay S, shunted by a diode 250, and through switch 249, to terminal 228 of supply 222, and its emitter 248*e* connected to terminal 230 of supply 222. Normally open switch contacts $S_2$ of relay S are connected in series with a resistance 252 between collector 248*c* and emitter 248*e* and thus form a shunt holding circuit for relay S. Circuit bias for transistor 248 is supplied through a variable resistance 254 which is connected between emitter 248*e* and base 248*b*. Also connected between emitter 248*e* and base 248*b* in parallel with resistance 254 is a normally open switch 162 which when closed serves to short the emitter 248*e* and base 248*b* together to render the transistor 248** non-conductive.

Transistor 248 is normally non-conducting and thus stop relay S is normally de-energized because switch $S_2$ is normally open. When voltage on base **248*b* is driven above the voltage on emitter 248*e*, as where base 248*b* is connected to terminal 228 of supply 222 by closing of stop switch 243 or by moving run/step switch 245 to the step position, transistor 248 conducts and there is a current path through switch 249 available to energize stop relay S. Energization of stop relay S closes relay contacts $S_2$ to complete a holding circuit for relay S through resistor 252 and closes switch contacts $S_1$ to energize stop solenoid 122. Energization of stop solenoid 122 positions the lever 128 to disable the claw arm 36 in the manner described hereinbefore. Movement of the lever 128 also closes switch 162 which functions to short together base 248*b* and emitter 248*e* of transistor 248 to render transister 248 non-conductive. The stop relay S will remain energized, however, through the action of the holding circuit established by relay contacts $S_2$, while stop solenoid 122 will remain energized through the energizing circuit established by the closing of relay contacts $S_1$. Energization of solenoid 122 also causes opening of switch 273 as is indicated by the dotted line joining solenoid 122 and switch 273 to remove the shunt from resistance 275. Resistance 275 serves to limit the current in the energizing circuit of stop solenoid 122 to such a reduced value as is necessary to keep solenoid 122 energized. To de-energize stop relay S, the contact arm of switch 249 is moved between the fixed contacts thereof to momentarily break the holding circuit. De-energization of stop solenoid 122 subsequent to de-energization of stop relay S is controlled by normally closed switch 151 which is opened once during each revolution of face cam 64 by cam lobe 138_b_ as hereinbefore described. More specifically, switch 151 when closed connects the stop solenoid 122 in series with resistance 240 across the output terminals 214 and 216 of power supply 209. Because of the voltage drop across resistance 240, the circuit so formed does not develop sufficient voltage to initially actuate the solenoid armature. This voltage is, however, sufficient to hold the solenoid armature once the armature has been completely displaced. Accordingly, with stop relay S de-energized and switch contacts $S_1$ open, the stop solenoid 122 will remain energized through the holding circuit established through resistance 240 and switch 151 until switch 151 is opened by cam lobe 138_b_. Opening of switch 151 is synchronized with the operation of claw arm 36** in a manner set forth hereinbelow.

The photocell 208 and its associated circuit constitute means, in addition to switches 243 and 245, for controlling the conductivity of transistor 248. With switch 247 in the automatic position, a path exists from terminal 228 of supply 222 through switch 247 and a resistance 255 to one side of photocell 208. A two-pole, two-throw switch 267 is set according to the type of code marks on the film to be projected. For a clear code mark on a non-transparent border, the contacts of switch 267 will be moved to the "opaque" position as shown in FIG. 7, wherein the circuit from supply terminal 228 is completed through switch 139 to base 248_b_ of transistor 248. For this mode of operation, with photocell 208 illuminated, as hereinbefore described, when a code mark is present, the light falling on photocell 208 will cause an increase in voltage output of the cell 208. With switch 139 closed this increase in voltage appears at the base 248_b_ of transistor 248 to render transistor 248 conductive.

For opaque code marks used on a clear film border, the contacts of switch 267 are moved to the "clear" position shown in FIG. 7, wherein photocell 208 is connected to the base 261_b_ of a second p-n-p transistor 261. Transistor 261 is part of a signal inverting circuit used to accommodate a reversal of code contrast, which circuit also comprises resistance 277 and 265. The collector 261_c_ of transistor 261 is connected to a junction between resistances 277 and 265 while the emitter 261_e_ is connected to terminal 230 of supply 222. Resistances 277 and 265 are connected in a series circuit between supply terminal 228 and the base 248_b_ of transistor 248 which includes switch 247, resistance 277, resistance 265, switch 267 and switch 139. For this mode of operation, in the absence of a code mark, there will be illumination of the photocell 208 through the clear film base so that cell 208 produces an output voltage. This voltage will elevate the base 261_b_ with respect to emitter 261_e_ so that transistor 261 conducts. With transistor 261 conducting the junction of transistor 261, resistance 277 and resistance 265 is held at a voltage near that of the circuit ground at supply terminal 230. Thus the base 248_b_ of transistor 248 is also held near circuit ground, therefore, preventing conduction of transistor 248 and the resultant energization of stop relay S. Transistor 261 will be held on until an opaque code mark moves into place in front of the aperture 204 to block illumination of photocell 208 and thus cause the output of the cell 208 to fall to near zero. With the cell output near zero the voltage drive on base 261_b_ is removed and transistor 261 is turned off. With transistor 261 turned off, the voltage on the junction of the transistor collector 261_c_ and resistances 277 and 265 is allowed to move toward a voltage near the supply voltage at terminal 228. This voltage will also appear at base 248_b_ to render transistor 248 conductive to cause energization of stop relay S as hereinbefore described.

Resistance 255 and stabistor 272 connected between supply terminals 228 and 230 provide a fixed reference voltage at the junction of resistance 255, stabistor 272 and photocell 208. A resistance 263 is connected across the emitter 261_e_ and the base 261_b_ of transistor 261, while resistance 254 is connected across the base 248_b_ and emitter 248_e_ of transistor 248. As described hereinbelow either resistance 263 or 254 serves to load photocell 208 depending on the position of switch 267.

Figure 8:
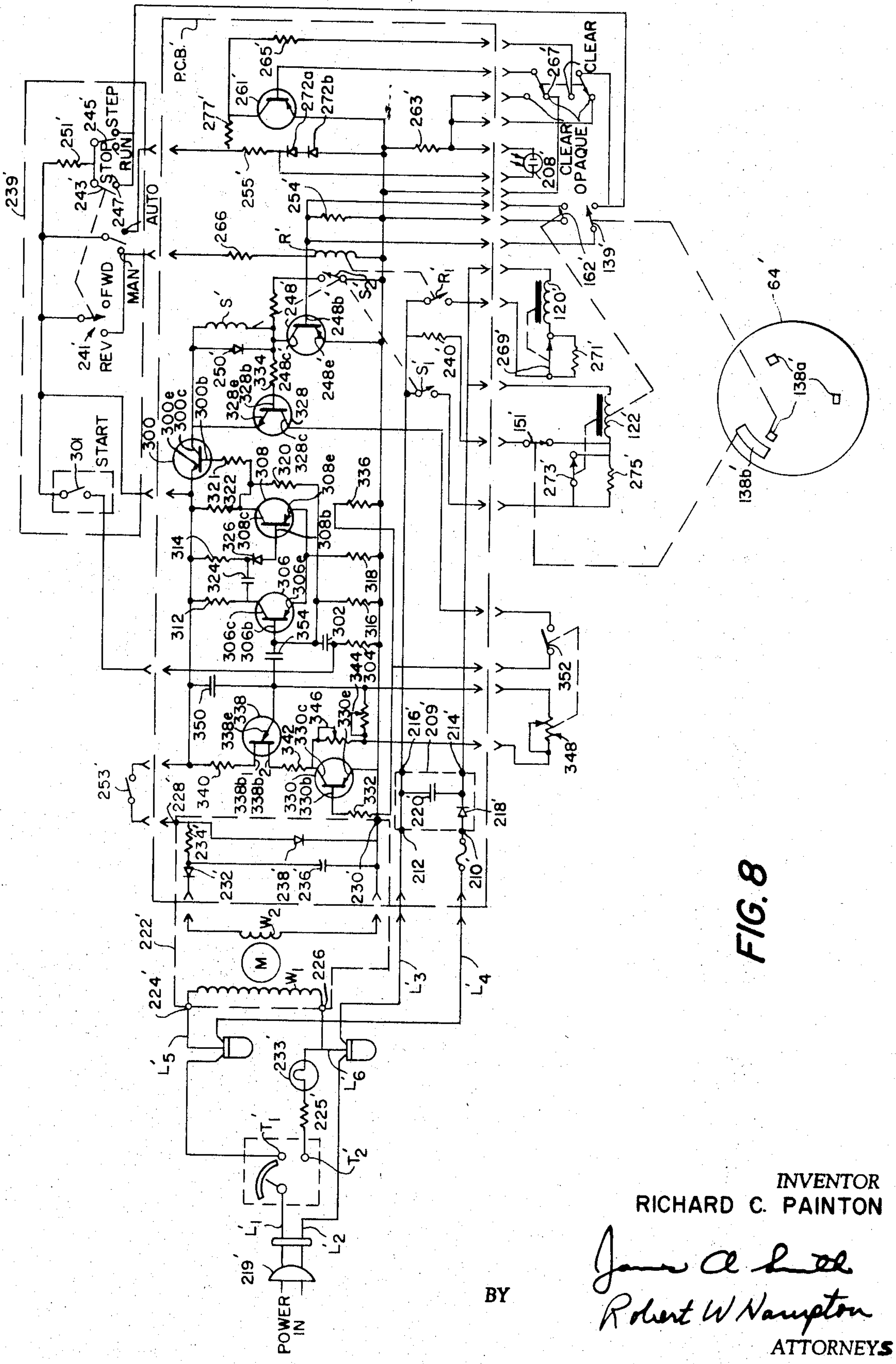
FIG. 8 is a schematic diagram of a second embodiment of a control circuit in accordance with the invention for controlling the operation of the projector system, this second embodiment differing from the first embodiment primarily in incorporating an electronic reset and electronic timer for restoring the system to motion projection.
Figure 9:
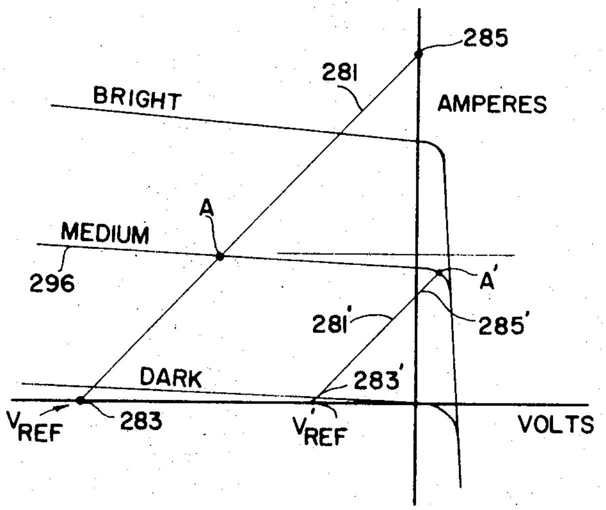
FIGS. 9 to 11 are representations of the volt-ampere characteristics of the exemplary light sensing means shown in FIGS. 1, 5, and 6.
Figure 10:
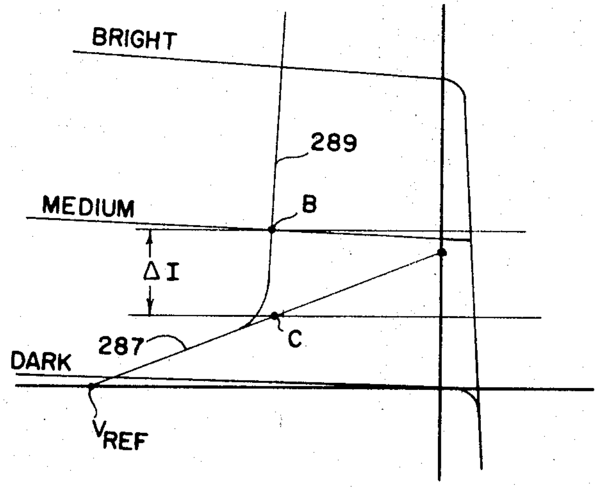
Figure 11:
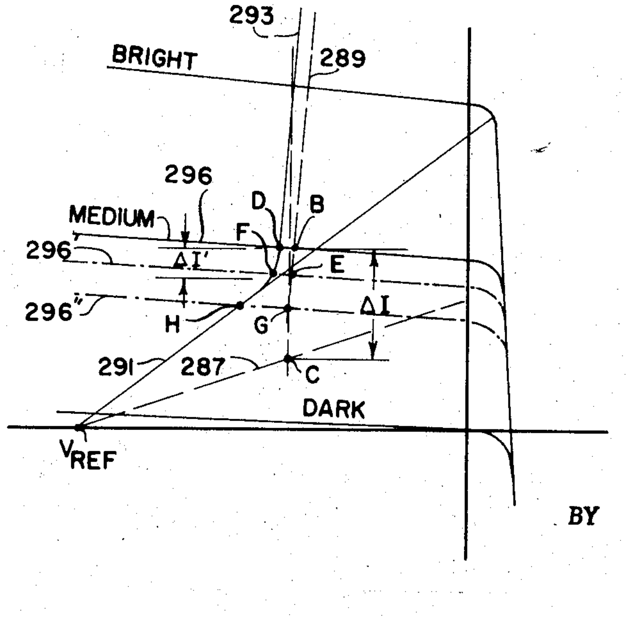

Referring to FIGS. 9 to 11, the volt-ampere characteristics of photocell 208 are represented on which an operating load line 281 is drawn. Three constant-current curves are shown which are labelled dark, medium and bright to represent the current characteristics corresponding to the various intensities of illumination of the cell 208. It will be understood that the three curves shown are merely representative of a family of similar curves. The voltage $V_{ref}$ indicated by reference numeral 283 is the voltage across the photocell 208 with zero current output and is determined by the value of voltage at the junction of resistance 255, stabistor 272 and photocell 208. The current indicated by reference numeral 285 is the output current corresponding to zero voltage output and is determined by dividing the voltage $V_{ref}$ by the value of resistance 263 or 254. As is well known in the art, the intersection of the load line 281, drawn between points 283 and 285, and one of the constant illumination curves determines the operating point for the cell 208, which is indicated, for medium illumination curve 296, by reference letter A. In accordance with the present invention stabistor 272 is chosen so that the reference voltage $V_{ref}$ is sufficient to ensure that the photocell 208 will be operated in its linear region. For example, with a voltage $V'_{ref}$ of value indicated by reference numeral 283' in FIG. 9, such as might be supplied by a single diode, the intersection of a load line 281' drown through $V'_{ref}$ and a point 285', determined by dividing $V'_{ref}$ by the value of resistance 263 or 254, with the same medium constant current curve results in an operating point A' which is located in the non-linear region of the characteristics. By using a stabistor 272 or, alternatively, a pair of diodes as shown in FIG. 8, operation of photocell 208 in its non-linear region is avoided. Further as can be seen by comparing the current outputs of the cell 208 corresponding to points A and A' the use of stabistor 272 also provides greater circuit current drive.

Referring to FIG. 10, the characteristics of photocell 208 are shown for a case where the base-to-emitter junction of a transistor is connected as an additional load. As described hereinbefore, with switch 267 in the "opaque" position, as shown in FIG. 7, the cell 208 is connected through switch 139 to the base 248_b_ of transistor 248. With switch 267 in the "clear" position, cell 208 is connected to the base 261_b_ of transistor 261. Thus with switch 267 in the "opaque " position and switch 139 closed, the cell 208 is loaded by the base-to-emitter resistance of transistor 248 and by resistance 254 and, with switch 267 in the "clear" position, the cell 208 is loaded by the base-to-emitter resistance of transistor 261 and by resistance 263.

The characteristics of cell 208 with switch 267 in the "clear" position are represented in FIG. 10. The cell characteristics with switch 267 in the "opaque" position would, of course, be similarly represented. FIG. 10 is similar to FIG. 9 with load line 287 as shown generally corresponding to load line 281 but representing a somewhat higher value of resistance. This value of resistance is, with switch 267 in the clear position, the value of resistance 263. When the base-to-emitter junction of transistor 261 conducts the resistance of the junction approaches zero and thus may be represented by a nearly vertical load line 289 in FIG. 10 which diverges from load line 287 at value corresponding to the voltage at which conduction takes place. This voltage, which is referenced to the voltage $V_{ref'}$, remains relatively constant once conduction begins. The current output of the cell 208 increases under these circumstances from a value represented by the operating point C corresponding to current output in resistance 263 to a value represented by the new operating point B. The difference in the current is represented by ΔI in FIG. 10 and this difference is the current available to drive the base-to-emitter junction of transistor 248. Thus the approach represented in FIG. 10 provides additional circuit drive as compared with the purely resistive loading represented in FIG. 9.

Referring to FIG. 11, the results of varying variable resistance 263 are illustrated. Load lines 287 and 289 of FIG. 10 are shown as dashed lines in FIG. 11 and correspond to a first value of resistance 263, for which load line 289 intersects the medium constant current curve 296 at a point B as described hereinbefore. With the value of resistance 263 decreased a new load line, represented by line 291 and corresponding to the new value of resistance 263, is produced. Corresponding transistor load line 293 extends nearly vertically and diverges from load line 291 in the manner previously described. The new load lines 291 and 293 produce a new operating point indicated at D. Investigation of FIG. 11 reveals that the base-to-emitter current drive ΔI', furnished with the new operating point D is considerably less than the base-to-emitter current drive, ΔI, furnished with old operating point B. Thus by varying the value of resistance 263 (or the value of resistance 254 with the switch 267 in the "opaque" position), the amount of base-to-emitter current drive can be varied.

Other instances in which varying the load line may be important are illustrated in connection with curves 296' and 296'' which represent two other constant current curves for photocell 208 generally in the region of medium intensity. With variation in the density of the film used there will be consequent variation in the amount of light falling on photocell 208 which means that when used with a somewhat less transparent filmstrip photocell 208 might be operating on curve 296' or on curve 296''. The operating point for load lines 291 and 293 under these conditions is indicated at F for curve 296' and at H for curve 296'', as compared with the corresponding operating points for load lines 287 and 289 which are indicated at E and G for curves 296' and 296'', respectively. It will be noted that operating point F falls in an area wherein base-to-emitter conduction of transistor 261 begins, and thus point F is a relatively uncertain point. It will be further noted that operating point H falls on the purely resistive load line 291, and thus transistor 261 is not turned on under these circumstances. The undesirable characteristics of operating points F and H are avoided with load lines 287 and 289 wherein operating points E and G corresponding thereto are located in areas free from non-linearities and where the indicated voltage is sufficient to render transistor 261 conductive. Thus control over the operating point through variation of the load resistance provides means for controlling the nature and value of the current output of the photocell 208.

Returning to the operation of the control circuit of FIG. 7, the operations of switches 139 and 151 will now be considered. As stated hereinbefore switch 139 is controlled by cam lobes 138*a* which are positioned on face cam 64 in such a manner and are of such a length to ensure that switch 139 will be closed after pull-down claw teeth 50 are extracted from the film and that switch 139 will remain closed during nearly half of the following stroke during which upward movement of claw arm 36 takes place. Accordingly transistor 248 can only be energized during this closed time and thus stopping of the film with the claw teeth 50 engaged is prevented. The provision of three cam lobes 138*a* permits transistor 248 to be energized three times during a complete revolution of face cam 64.

Switch 151 is controlled by single cam lobe 138*b* which is so positioned on face cam 64 and which is of such a length as to open switch 151 during a length of time, starting just after the claw teeth 50 are extracted, sufficient to ensure drop out of solenoid 122 when relay S is de-energized.

It is noted that the operation of the transistor 248, stop relay S. solenoid 122 and switches 139 and 151 decsribed hereinbefore is the same for each of the various modes of operation of the circuit now to be described. Under normal conditions, with switch contact 223 contacting terminal $T_1$, the projector will be running forward at whatever rate is selected.

Stopping of the projector can be effected by switch 243 which when depressed elevates base 248*b* of transistor 248 by connecting it to supply terminal 228. Switch 243 is connected to base 248*b* through switch 139 so that conduction of transistor 248 and resultant stopping of the projector in the manner hereibefore described cannot take place without the claw teeth 50 of claw arm 36 being extracted from the filmstrip F.

A single frame forward mode of projection is effected by setting the contact arm of run/step switch 245 in the step position which also completes the circuit between base 248*b* of transistor 248 and supply 228. With switch 245 in the step position transistor 248 will be rendered conductive when switch 139 is engaged by the next cam lobe 138*a* to energize stop relay S and stop solenoid 122 in the manner hereinbefore described. Solenoid-controlled switch 162 will close to short the emitter-base circuit of transistor 248 as described to render the transistor 248 non-conductive, the relay S being held energized by the holding circuit established by contacts $S_2$. The system will thus be stopped and still projection will take place. The filmstrip may then be advanced by manual actuation of start switch 249 to break the holding circuit for stop relay S toward effecting de-energization of stop solenoid 122. As described hereinbefore stop solenoid 122 will then be de-energized upon action of switch 151 by cam 138*b*. With solenoid 122 de-energized, switch 162 will open to eliminate the short circuit between the base 248*b* and emitter 248*e* of transistor 248. The time lapse between de-energization of solenoid 122 by operation of cam 128*b* and re-energization of relay S subsequent to the opening of switch 162 is sufficient to permit one pull-down cycle of claw arm 36. Thus, in this manner, the filmstrip F may be advanced frame by frame through gate 10 by manual actuation of switch 249 when switch 245 is in the "step" position.

A reverse mode of projection may be effected by closing switch 241. As stated hereinbefore a mechanical interlock between stop switch 243 and reverse switch 241 dictates that switch 243 must first be depressed before switch 241 can be shifted to a new position. Operation of the reverse switch 241 energizes relay R by completing the circuit between the supply terminals 228 and 230. Energization of reverse relay R closes relay contacts $R_1$ to complete the energization circuit for reverse solenoid 120. Solenoid 120, when energized, produces reverse motion of the projector in a manner described hereinbefore. Energization of solenoid 120 also causes opening of switch 269 to remove the short circuit from shunt resistance 271. Resistance 271 limits the current in the solenoid circuit to a value sufficient to hold solenoid 120 energized.

With solenoid 120 energized a single frame reverse mode of operation may be effected by moving run/step switch 245 to the step position. The system will function under these conditions in the same manner as during single frame forward operation except that actuation of start switch 249 will effect single frame advance of the filmstrip in the reverse direction.

The projector may also be operated in a predetermined number of frames forward mode of operation through actuation of the code responsive circuit as described hereinbefore. Actuation is effected by setting switch 247 to the automatic position and setting switch 267 to the "clear" or "opaque" position depending on the type of film used. When a code mark is present in aperture 204 the projector is stopped as described hereinbefore and there is still projection until manual break switch 249 is actuated to start the projector running again. The projector will continue to run until a new code mark is encountered. The coded frame technique can be used for both forward and reverse operation to produce still projection in accordance with the coding.

In FIG. 8, a second embodiment of the invention is shown wherein an electronic start or reset circuit and an electronic timer are provided. Except for the provision of the electronic reset and timer and a few minor variations in circuitry, the circuit of FIG. 8 is the same as that of FIG. 7, and those elements of FIG. 7 which correspond to FIG. 8 have been designated by the primes of the reference numerals used in FIG. 7. As to the minor variations in circuitry, stabistor 272 is replaced by a pair of diodes 272*a* and 272*b*, resistor 265' is fixed, resistor 263' is fixed and is connected between the emitter of transistor 261' and a point on the connection between photocell 208' and switch 267', a resistor 266 has been placed in the connection between switch 241' and reverse relay R' and certain connecting or jumper wires have added to switch 267'. New switch 301 controls the reset circuit and replaces mechanical reset switch 249.

Electronic reset

The electronic reset or start circuit comprises a n-p-n transistor 300 utilized as a solid state switch, a trigger network comprising a capacitor 302 and a resistance 304 and a monostable multivibrator comprising p-n-p transistors 306 and 308, resistances 312, 314, 316, 318, 320, and 322, a capacitor 324 and a diode 326.

Control switch 301 is connected to a junction point on the series connection of capacitor 302 and resistance 304 between the elements. The other side of capacitor 302 is connected both to the base terminal 306*b* of transistor 306 and, through resistance 320, to a point on the connection between a base resistance 321 of transistor 300 and the collector terminal 308*c* of transistor 308. The collector terminal 306*c* of transistor 306 is connected both to, through resistance 312, the supply terminal 228' and to, through capacitor 324 and diode 326, the base 308*b* of transistor 308. A junction point between capacitor 324 and diode 326 is connected through resistance 314 to the supply terminal 228'. The collector 308*c* of transistor 308 is also connected to supply terminal 228', through resistance 322. The emitter terminals 306*e* and 308*e* of transistors 306 and 308, respectively, are connected together at a common point which is connected through resistance 318 to supply terminal 230'. Resistance 316 is also connected to supply terminal 230', from a point on the connection between capacitor 302 and resistance 320. Emitter terminal 300*e* of transistor 300 is connected to supply terminal 228' while collector terminal 300*c* is connected to the junction point of a diode 250' and a stop relay S'.

Figure 12A:
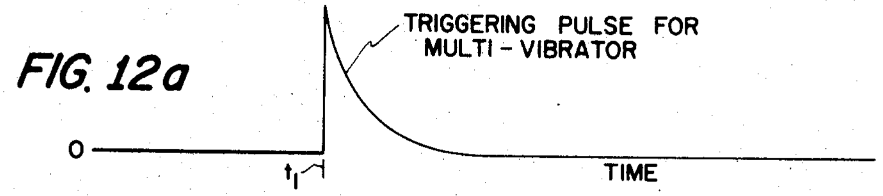
FIGS. 12*a* to 12*e* are representations of waveforms associated with the electronic reset circuit shown in FIG. 8.
Figure 12B:
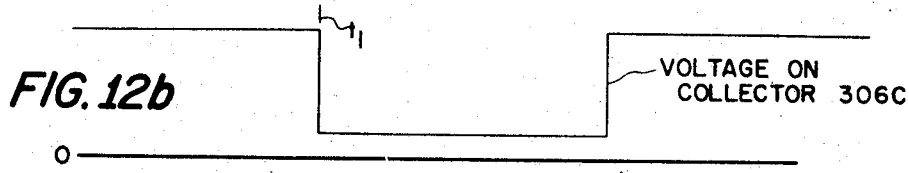
Figure 12C:
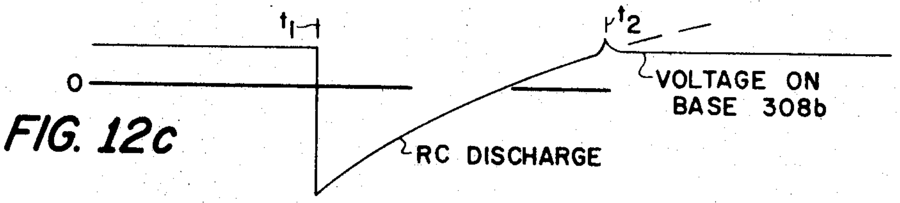
Figure 12D:
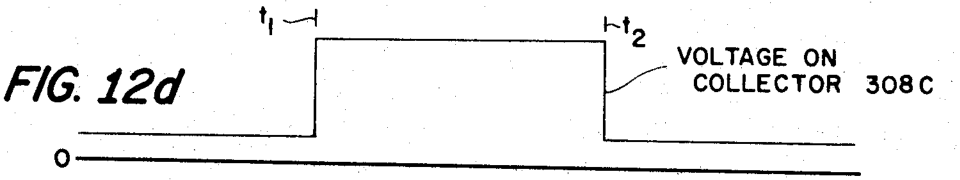
Figure 12E:
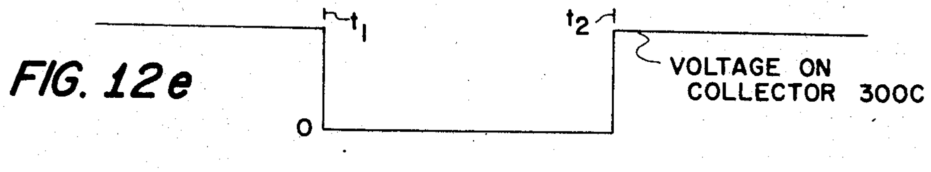

FIGS. 12*a* to 12*e* show waveforms associated with the electronic reset circuit. FIG. 12*a* shows the voltage waveform of the input to the multivibrator circuit, that is, input voltage plotted as a function of time; FIG. 12*b* shows the collector voltage waveform of transistor 306; FIG. 12*c* shows the base voltage waveform fo rtransistor 308; FIG. 12*d* shows the collector voltage waveform also for transistor 308; and FIG. 12*e* shows the collector voltage waveform for transistor 300.

In operation, switch 301 is used in conjunction with capacitance 302 and resistance 304 to trigger the monostable multivibrator which includes transistors 306 and 308. Closing of switch 301 provides a pulse in the form of a step function which is differentiated by the differentiator formed by capacitance 302 and resistance 304 to produce a trigger pulse as shown in FIG. 12*a*. Differentiating of the pulse produced by switch 301 is performed to permit the multivibrator circuit to return to its stable state even when switch 301 is closed indefinitely.

In the absence of the trigger of FIG. 12*a*, transistor 306 is held "off" or in its non-conducting state by resistance 316 which holds the base 306*b* at a voltage whose absolute value is below that on the emitter 306*e*. At the same time transistor 308 is held "on" or in its conducting state through the voltage drive provided by resistor 314 which raises the voltage on base 308*b* above that on emitter 308*e*. With transistor 308 on transistor 300 is also on, the emitter 300*e* of transistor 300 being negative with respect to the base 300*b* thereof. As is shown in FIGS. 12*a* to 12*e*, these conditions are maintained until a trigger is applied at a time $t_1$.

With a trigger applied thereto, the voltage on base 306*b* is elevated above the voltage on emitter 306*e* and transistor 306 conducts. With transistor 306 conducting the voltage on collector 306*c* falls from the supply voltage level to emitter voltage level and this change is coupled through capacitor 324 to the base 308*b* of transistor 308. The new voltage on base 308*b* is below that on emitter 308*e* and thus transistor 308 is turned off. With transistor 308 off the voltage on collector 308*c* rises to a voltage near the supply voltage level at terminal 228' thus elevating the voltage on base 300*b* to that on emitter 300*e* of transistor 300 and causing transistor 300 to turn off.

The states just described, i.e., transistor 306 on, transistor 308 off and transistor 300 off, are maintained until capacitor 324 discharges. This discharge time for capacitor 324 is determined by the RC time-constant dictated by the values of capacitor 324 and resistances 314 and 318. The collector-to-emitter path of transistor 306 serves as a discharge path for capacitor 324 as long as transistor 306 is conducting. When capacitor 324 charges to value sufficient to turn transistor 308 on again, indicated in FIGS. 12*b* to 12*e* as time $t_2$, the decrease in voltage on collector 308*c* is coupled back to the base 306*b* of transistor 306 thereby turning transistor 306 off again. With transistor 308 again conducting, transistor 300 is also conducting and thus the voltage on collector 300*c* rises to the supply voltage furnished at terminal 228'.

Diode 326 is arranged to prevent a premature discharge of capacitor 324 through the base-to-emitter junction of transistor 308 when the breakdown voltage of that junction is exceeded.

Referring to FIG. 12*e* it can be seen that by turning transistor 300 off, the voltage on the collector 300*c* drops to circuit ground. Since this voltage on collector 300*c* is the voltage across the stop relay circuit, stop relay S' is de-energized. With stop relay S' de-energized, stop solenoid 122' is also de-energized in the manner set forth hereinbefore in connection with FIG. 7.

The chief advantages of the electronic reset switch over the momentary break switch 249 of FIG. 7 are that the electronic reset switch is more reliable and controllable. The time for reset provided by electronic reset is uniform in contrast to that provided by mechanical reset switch 249 which may vary slightly. Further, the electronic reset may be adjusted to provide a reset time of sufficient duration to ensure that the circuit relays drop out while with a mechanical reset switch is may not be possible to provide enough time for the slowest relays to drop out.

Lastly, the electronic reset is not susceptible to premature functioning as a result of mechanical disturbances.

Electronic timing circuit

The electronic reset circuit may be controlled through an electronic timing circuit whereby the reset circuit is automatically actuated after the passage of a predetermined amount of time after the system has responded to a code mark or to another stop signal.

The electronic timer comprises two logic stages including transistors 328 and 330, resistances 332, 334, and 336 and a switch 352 and blocking oscillator including a unijunction transistor 338, resistances 340, 342, 344, 346 and 348 and a capacitor 350.

The base 328$b$ of n-p-n- transistor 328 is connected, through resistance 334, to the collector 248$c'$ of transistor 248' while the emitter 328$e$ is connected to the collector 300$c$ of transistor 300. The collector 328$c$ is connected through a switch 352 to a junction point and from the junction point to supply terminal 230', through resistance 336, and to the base 330$b$ of p-n-p transistor 330, through a resistance 332. The emitter 330$e$ of transistor 330 is connected to supply terminal 230' while the collector 330$c$ is connected to a junction, one branch of which is connected through resistance 342 to the base 338$b_2$ of unijunction transistor 338 and the second branch of which is connected through resistance 346 and resistance 344 to the junction point of a connection from the emitter 338$e$ of unijunction transistor 338, a connection between capacitor 350 and supply terminal 228' and a connection between a capacitor 354 and the base 306$b$ of transistor 306. The base 338$b_1$ of transistor 338 is connected to supply terminal 228' through resistance 340 while a resistance 348 is connected in parallel with resistance 344.

Figures 13A, 13B:
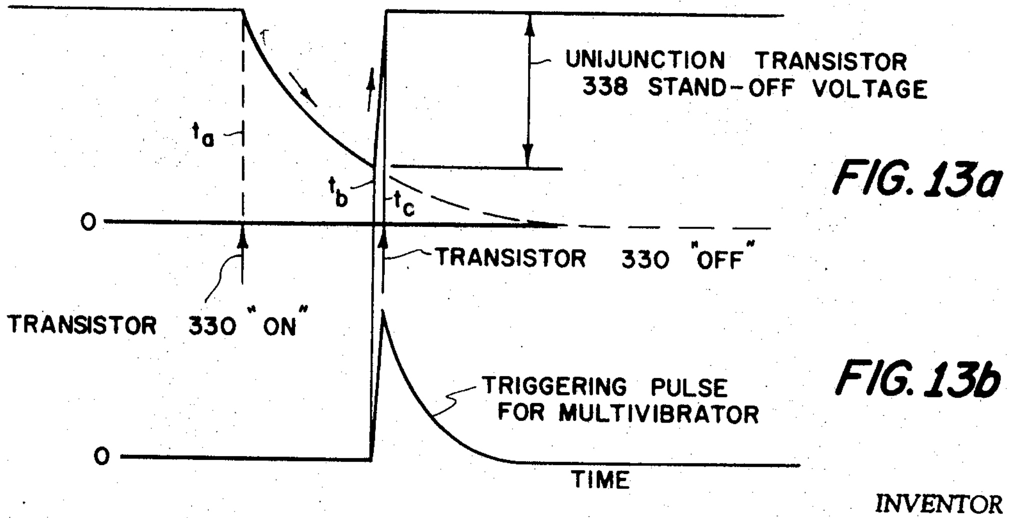
FIGS. 13*a* and *b* are representations of waveforms associated with the electronic timing circuit shown in FIG. 8.

FIGS. 13$a$ and 13$b$ show waveforms associated with the operation of the timing circuit FIG. 13$a$ shows the voltage waveform at the emitter 338$e$ of unijunction transistor 338 and FIG. 13$b$ shows the output pulse produced by the timing circuit.

Actuation of the timing circuit is dependent in general upon whether or not transistor 248' is conducting. The timing circuit may, for example, be used with the code mark responsive circuit including photocell 208 to produce fully automatic operation of the projector. As has been described hereinbefore in connection with FIG. 7, the presence of a code mark causes a change in electrical output of photocell 208', the type of change depending on the type code mark used. This change in electrical output is used to render transistor 248' conductive which causes stop relay S' to be energized, thereby energizing stop solenoid 122' to stop the motion of the projector.

Transistor 328 is normally non-conducting or off and is turned on, at a time $t_a$ indicated in FIG. 13$a$, when transistor 248' is turned on, the emitter 328$e$ of transistor 328 being driven negative with respect to the base 328$b$. With transistor 328 conducting the voltage on collector 328$c$ rises toward the supply voltage at terminal 228' and this voltage increase is coupled to the base 330$b$ of transistor 330 elevating the voltage on base 330$b$ above that on emitter 330$e$ and thereby rendering transistor 330 conductive. Transistor 330 in its conducting state provides a charge path for capacitor 350 through resistances 344, 346 and 348. The charging time, which is generally the delay time of the timing circuit, is determined by the RC time-constant dictated by the values of capacitor 350 and resistances 344, 346, and 348. Capacitor 350 will charge up to the "stand-off" voltage of unijunction transistor 338, a time indicated in FIG. 13$a$ by reference letter $t_b$. When the stand-off voltage is reached unijunction transistor 338 conducts and furnishes a discharge path for capacitor 350 through resistor 340. The discharge time for capacitor 350 is determined by the RC time-constant dictated by the values of capacitor 350 and resistance 340 and as is shown in FIG. 13$a$ this discharge time ($t_c-t_b$) is very short as compared with the charging time ($t_b-t_a$) and thus produces a steep slope similar to that of the step function produced by closing switch 301. The voltage waveshape thus produced is differentiated by the differentiator formed by capacitor 354 and resistance 316 to produce a triggering pulse shown in FIG. 13$b$ which is similar to that produced by the differentiator formed by capacitor 302 and resistor 304 (FIG. 12$a$) and which is used in the same way to trigger the multivibrator of the reset circuit as described hereinbefore.

The timing circuit is limited in operation to producing a single pulse because as soon as the first pulse is generated, transistor 300, as described hereinbefore, is turned off and thus, because the emitter 328$e$ of transistor 328 is connected to the collector 300$c$, the attendant rise in the voltage on collector 300$c$ renders transistor 328 nonconducting. With transistor 328 off the base drive for transistor 330 is removed and thus transistor 330 will be turned off also. Under these circumstances capacitor 350 cannot recharge and thus must wait until the presence of the next stop code signal.

Resistance 348 is variable and is used as an external control for the delay time of the circuit to vary the charging time of capacitor 350. Resistances 344 and 346 are also variable and are used to make calibration adjustments for the two limits of the settings of resistance 348.

Switch 352 may be used to disconnect the timing circuit where, for example, viewing times of varied or indeterminate lengths are desired.

An important feature of the timing circuit is that the triggering pulse (FIG. 13$b$) produced thereby is synchronized with the operation of the photocell circuit through the connection to transistor 248'. Although it might be possible to apply a series of timed pulses to the input of the multivibrator of the reset circuit to effect reset, without synchronizing the operation to that of the photocell stop circuit, the viewing time for the stopped frame will range from the full time between pulses to almost no time under conditions where the reset pulse is applied immediately after stopping of the film by the code mark. By synchronizing the operation of the timer with that of the photocell control circuit the amount of viewing time is uniform. As stated hereinbefore, the viewing time is approximately equal to the charging time of capacitor 350 and may be adjusted by adjustment of the value of resistance 348.

An additional possible mode of operation is provided by the timing circuit when used with switch 245 in the step position and with the photocell control circuit disconnected. With switch 245' in the step position the projector will stop after transistor 248' is rendered conductive by the closing of switch 139' by cam lobe 138$a'$ as described in connection with FIG. 7. With transistor 248' conducting, the timing circuit and thus the reset circuit will be actuated in the manner described hereinbefore. Thus the projector will be reset for motion and there will be advancement of the filmstrip until motion is stopped again by the action of the next cam lobe 138$a'$. Again, with the operation of the timing circuit initiated by the conducting state of transistor 248', full viewing time is assured.

Apart from the electronic reset circuit and the electronic timer the circuit of FIG. 8 operates in essentially the same way as the circuit of FIG. 7 and further explanation of the overall operation of the circuit of FIG. 8 is thought unnecessary.

The component switches of remote control unit 239 of FIGS. 7 and 8 may be located in a suitable housing or box which can be held by the operator to facilitate operation of the system. A suitable extension cable containing the electrical switches can be provided to impart limited portability to such a box relative to the projection system.

It will be appreciated that the control circuit shown in FIGS. 7 and 8 provides selective remote control over the various modes of motion, still, forward and reverse projection, which may be controlled from the remote control unit 239, in addition to the mechanical control of such functions which may be effected by selective positioning of cam follower 54 in the manner described hereinbefore. The remote control system can be utilized at any one of the forward or reverse projector speeds (54, 18 and 6 frames per second) which can be selected by positioning of knob 76. Because of the relatively fast response time required of components when using a speed of 54 frames per second, operation at 18 or 6 frames per second is preferred.

It will be understood by those skilled in the art that the embodiments of the invention shown and described herein are subject to various modifications without departing from the scope and spirit of the invention. Accordingly, it should be understood that the invention is not limited by the exemplary embodiments shown and described, but rather only by the subjoined claims as construed in light of the foregoing specification and drawings.

I claim:

1. In a projector system for interchangeably projecting image frames contained on first and second different types of coded film having first and second different types of code marks corresponding to selected frames to be still projected, the combination comprising, a film gate having a projection aperture, means for advancing the film through said gate to successively position the image frames in alignment with said aperture to effect motion projection of the film, means for disabling said film advancing means to effect still projection of an image frame, and means selectively responsive to the presence of said first type of code mark or said second type of code mark for automatically actuating said disabling means to effect still projection of the frames corresponding to said code marks, whereby said projector is selectively operable with either type of coded film.

2. In a projector system as claimed in claim 1 wherein said first type of coded film comprises a transparent code mark on a nontransparent film base and said second type of coded film comprises a nontransparent code mark on a transparent film base.

3. In a projector system as claimed in claim 2 wherein said selectively responsive means includes means for converting the effect of the presence of the second type of code mark to produce an operational effect equivalent to that produced by the presence of the first type of code mark.

4. In a projector system as claimed in claim 2 wherein said responsive means comprises an electronic switch for controlling actuation of said disabling means, a light source positioned on one side of the coded film and photosensitive cell means positioned on the other side of the coded film in line with the path of said code marks for controlling said electronic switch in response to the presence or absence of a code mark.

5. In a projector system as claimed in claim 4 wherein said responsive means further includes selectively operable means for converting the response of the photosensitive means to the presence of the second type of code mark to produce an electronic switch control signal operationally equivalent to that produced by the presence of the first type of code mark.

6. In a projector system as claimed in claim 5 wherein said converting means includes a second electronic switch for selective connection in circuit relationship with said photosensitive means and said first electronic switch, and switching means for selectively connecting and disconnecting said second electronic switch depending on the nature of the code mark to be used.

7. In a projector system as claimed in claim 6 wherein said first and second electronic switches comprise first and second transistors and wherein said switching means comprises a switch having two positions, the first position of said switch connecting said photosensitive means to the base electrode of said first transistor and the second position of said switch connecting said photosensitive means to the base electrode of said second transistor and connecting a second electrode of said second transistor to the base electrode of said first transistor.

8. In a projector system as claimed in claim 6 further comprising electronic reset means for electronically deactuating said disabling means to effect resumed advance of the film, said electronic reset means comprising a third electronic switch for controlling de-actuation of said disabling means and monostable multivibrator means for controlling said third electronic switch, and electronic timing means responsive to the state of said first electronic switch for controlling said monostable multivibrator means, said timing means comprising at least one logic stage and blocking oscillator means.

9. In a projector system as claimed in claim 3 wherein said responsive means includes a photosensitive cell and a first transistor connected as a load for said photosensitive cell where said first type of code mark is used and a second transistor connected as a load for said photosensitive cell where said second type of code is used, whereby when said transistors conduct, the current output of the cell is increased.

10. In a projector system as claimed in claim 9 wherein a variable resistance means is connected as a further load for said photosensitive cell whereby a variation of the variable resistance means will vary the output current of said photosensitive cell.

11. In a projector system as claimed in claim 3 wherein said responsive means includes a photosensitive cell, one side of said photosensitive cell being connected to a stabistor which provides a fixed reference voltage for said photosensitive cell of a value sufficient to ensure operation of said photosensitive cell in a linear region of the volt-ampere characteristics thereof.

12. In a projector system for projecting image frames contained on a film having code marks corresponding to selected frames to be still projected, the combination comprising, a film gate having a projection aperture; means for advancing the film through said gate to successively position the image frames in alignment with said aperture to effect motion projection of the film; means for disabling said film advancing means to effect still projection of an image frame; means responsive to said code marks for actuating said disabling means to effect still projection of the frame corresponding to said code marks, said code mark responsive means comprising a light source positioned on one side of the coded film and a photosensitive cell positioned on the other side of the coded film; and stabilization means connected to said photosensitive cell for providing a fixed reference voltage for said photosensitive cell sufficient to ensure operation in a linear region of the volt-ampere characteristics thereof.

13. In a projector system as claimed in claim 12 wherein said stabilization means comprises a stabistor.

14. In a projector system as claimed in claim 12 wherein said stabilization means comprises a pair of diodes.

15. In a projector system as claimed in claim 12 wherein said code mark responsive means further comprises a transistor and a variable resistance connected as a load for said photosensitive cell, whereby variation of the variable resistance will vary the operating point of the photosensitive cell.

16. In a projector system for projecting image frames contained on a film, the combination comprising, a film gate having a projection aperture, means for advancing the film through said gate to successively position the image frames in alignment with said aperture to effect motion projection of the film, means actuatable for disabling said film advancing means to effect still projection of an image frame, and selectively actuatable electronic reset means for electronically de-actuating said disabling means to effect resumed advancement of the film, said electronic reset means including an electronic switch having conductive and nonconductive states, the state of said electronic switch controlling de-actuation of said disabling means, and triggering means for controlling the state of said electronic switch.

17. In a projector system as claimed in claim 16 wherein said triggering means comprises monostable multivibrator means.

18. In a projector system as claimed in claim 17 wherein said electronic switch comprises a first transistor having base, collector and emitter electrodes, and wherein said monostable multivibrator means comprises second and third transistors each having base, collector and emitter electrodes, the base electrode of said third transistor being connected through a capacitor to the collector electrode of said second transistor whereby the voltage change resulting from a change in state of said second transistor is coupled to said base of said third transistor to effect a change in state of said third transistor, the voltage on the collector electrode of said third transistor controlling the state of said first transistor, and selectively operable trigger means for effecting a change in state of said second transistor.

19. In a projector system according to claim 18 wherein the discharge time of said capacitor determines the time said first transistor remains in the nonconductive state thereof and wherein a diode is included in the connection between said collector electrode of said second transistor and the base electrode of said third transistor, said diode being poled to prevent premature discharge of said capacitor through the base-to-emitter junction of said third transistor.

20. In a projector system as claimed in claim 17 wherein said electronic reset means is actuated by switch means and includes differentiator means for differentiating the output of said switch means to provide an input pulse for said monostable multivibrator means.

21. In a projector system as claimed in claim 16 further comprising electronic timing means for automatically actuating said electronic reset means after a predetermined period of time.

22. In a projector system as claimed in claim 21 wherein said electronic timing means comprises at least one logic stage and blocking oscillator means.

23. In a projector system as claimed in claim 21 wherein said electronic timing means comprises means responsive to operation of said disabling means whereby the beginning of said predetermined period of time substantially coincides with the beginning of the disabling action of said disabling means.

24. In a projector system as claimed in claim 23 wherein said timing means is adjustable to vary said predetermined time.

25. In a projector system as claimed in claim 21 wherein there is further included differentiating means for differentiating the output of said timing means; and wherein said disabling means comprises a first transistor having conductive and nonconductive states; wherein said electronic timing means comprises a second transistor having conductive and nonconductive states, a third transistor having conductive and nonconductive states, a unijunction transistor having a characteristic stand-off voltage, said unijunction transistor being conductive when said stand-off voltage is exceeded, and a capacitor, said second transistor being connected so as to be rendered conductive by the conductive state of said first transistor and said third transistor being connected so as to be rendered conductive by the conductive state of said second transistor, said third transistor being connected so as to provide, in the conductive state thereof, a charging path for said capacitor to permit said capacitor to charge up to a voltage substantially equal to the stand-off voltage of said unijunction transistor, whereupon said unijunction transistor conducts and said capacitor discharges therethrough; and wherein said electronic reset means comprises a fourth transistor having conductive and nonconductive states, said fourth transistor being connected so as to be rendered nonconductive by the differentiated output of said differentiator means, said fourth transistor when nonconductive rendering said second transistor nonconductive, the nonconductive state of said second transistor rendering said third transistor nonconductive to destroy the charging path through said third transistor whereby the output of said electronic timing means is limited to a single pulse.

26. In a projector system for interchangeably projecting image frames contained on first and second types of coded film having light-transmitting code marks and light-excluding code marks, respectively, the combination comprising, a film gate having a projection aperture, means for advancing the film through said gate to successively position the image frames of the film in alignment with said aperture to effect projection thereof, operational control means responsive to a predetermined control signal for effecting a predetermined change in the operational mode of the projector, and means selectively operable for transmitting said predetermined control signal to said operational control means in response selectively to the presence of a light-transmitting code mark or a light-excluding code mark.

27. In a projector system as claimed in claim 26 wherein said last mentioned means comprises a photosensitive device for detecting changes in incident light caused by said light-transmitting and light-excluding marks, first means for transmitting said predetermined control signal to said operational control means upon detection by said photosensitive device of a light-transmitting code mark, second means for transmitting said predetermined control signal to said operational control means upon detection by said photosensitive device of a light-excluding mark, and selector means for operatively connecting either of said first and second means to said photosensitive device and said operational control means.

28. In a projector system as claimed in claim 26 wherein said last mentioned means comprises a photosensitive device for responding in respectively different manners to the presence of a light-transmitting and a light excluding code mark, and selectively operable means for transmitting said predetermined control signal to said operational control means upon detection of a code mark of either type by said photosensitive device.

29. In a projector system as claimed in claim 26 wherein said last mentioned means includes a photosensitive device for responding in first and second manners, respectively, to the transmission and exclusion of incident light through said film, first selectively operable means operative only upon response of said photosensitive device in said first manner for transmitting said predetermined signal to said operational control means, second selectively operable means operative only upon response of said photosensitive device in said second manner for transmitting said predetermined control signal to said operational control means, and means for selectively connecting either said first means or said second means in operative association with said photosensitive device depending upon whether the film to be projected has light-transmitting or light-excluding marks.

30. In a projector system as claimed in claim 29 wherein one of said manners of response of said photosensitive device comprises the generation of a signal of the same character as said predetermined control signal, and wherein one of said first and second means comprises means for converting the second manner of response to correspond to the first manner of response.

References Cited

UNITED STATES PATENTS

| | | | |
|---|---|---|---|
| 1,944,024 | 1/1934 | Foster et al. | 352—92 |
| 2,906,187 | 9/1959 | Dotson et al. | 330—129 X |
| 3,212,399 | 10/1965 | Walter | 352—92 X |
| 3,301,628 | 1/1967 | Hellmund | 352—92 X |

JOHN M. HORAN, Primary Examiner

M. H. HAYES, Assistant Examiner

U.S. Cl. X.R.

352—137, 169